US010120453B2

(12) United States Patent
Hsueh et al.

(10) Patent No.: US 10,120,453 B2
(45) Date of Patent: Nov. 6, 2018

(54) METHOD FOR CONTROLLING ELECTRONIC EQUIPMENT AND WEARABLE DEVICE

(71) Applicant: INDUSTRIAL TECHNOLOGY RESEARCH INSTITUTE, Hsinchu (TW)

(72) Inventors: Wen-Chung Hsueh, Hsinchu (TW); Hsing-Chen Lin, Taichung (TW); Ching-Yu Huang, Taoyuan (TW); Bo-Sheng Wu, Tainan (TW); Chi-Hsiang Weng, Chiayi (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 39 days.

(21) Appl. No.: 15/167,192

(22) Filed: May 27, 2016

(65) Prior Publication Data
US 2017/0228027 A1    Aug. 10, 2017

(30) Foreign Application Priority Data
Feb. 5, 2016   (TW) .............................. 105104116 A

(51) Int. Cl.
*G06F 3/0346*    (2013.01)
*G06F 3/01*    (2006.01)
*G06F 1/16*    (2006.01)

(52) U.S. Cl.
CPC .............. *G06F 3/017* (2013.01); *G06F 1/163* (2013.01); *G06F 1/1694* (2013.01); *G06F 3/0346* (2013.01)

(58) Field of Classification Search
CPC .......... G06F 3/017; G06F 3/018; G06F 3/014; G06F 1/163; G06F 3/0485; G06F 3/0487; G06F 3/0346; G06F 3/04883; G06F 1/1694; H04M 1/72519
USPC ....................................................... 345/158
See application file for complete search history.

(56) References Cited

U.S. PATENT DOCUMENTS

| | | | | |
|---|---|---|---|---|
| 6,128,003 A | * | 10/2000 | Smith ................ | G06K 9/00355 345/156 |
| 7,679,601 B2 | * | 3/2010 | Chang ................... | G06F 3/0346 345/156 |
| 7,796,819 B2 | | 9/2010 | Sim et al. | |
| 8,289,162 B2 | | 10/2012 | Mooring et al. | |

(Continued)

FOREIGN PATENT DOCUMENTS

| | | |
|---|---|---|
| CN | 104121899 A | 10/2014 |
| CN | 203950271 U | 11/2014 |

(Continued)

OTHER PUBLICATIONS

Taiwanese Office Action dated Oct. 26, 2016.

*Primary Examiner* — Julio Perez
(74) *Attorney, Agent, or Firm* — Rabin & Berdo, P.C.

(57) ABSTRACT

A method for controlling an electronic equipment and a wearable device are provided, respectively. The method for controlling the electronic equipment includes the following steps. An inertial signal is detected. A gesture is obtained by dividing the inertial signal or classifying the inertial signal. A controlling command is outputted based on the gesture to control the electronic equipment, such as a desktop device, a portable device or the wearable device.

17 Claims, 8 Drawing Sheets

(56) References Cited

U.S. PATENT DOCUMENTS

| | | | |
|---|---|---|---|
| 2004/0169636 A1* | 9/2004 | Park | G06F 3/011 345/156 |
| 2012/0165074 A1* | 6/2012 | Soldan | G06F 3/0346 455/566 |
| 2012/0225719 A1* | 9/2012 | Nowozin | G06K 9/00342 463/36 |
| 2013/0154854 A1 | 6/2013 | Chen et al. | |
| 2014/0270375 A1* | 9/2014 | Canavan | A63B 24/0062 382/103 |
| 2014/0342670 A1* | 11/2014 | Kang | H04W 4/008 455/41.2 |
| 2015/0046886 A1* | 2/2015 | Goel | G06K 9/00342 715/863 |
| 2016/0065847 A1* | 3/2016 | Jiang | G06F 3/017 348/207.1 |
| 2016/0299570 A1* | 10/2016 | Davydov | G06F 1/163 |

FOREIGN PATENT DOCUMENTS

| | | |
|---|---|---|
| CN | 104656888 A | 5/2015 |
| CN | 104919394 A | 9/2015 |
| TW | 370330 U | 9/1999 |
| TW | I348639 B | 9/2011 |
| TW | I418334 B | 12/2013 |
| TW | I459929 B | 11/2014 |

\* cited by examiner

METHOD FOR CONTROLLING ELECTRONIC EQUIPMENT AND WEARABLE DEVICE

This application claims the benefit of Taiwan application Serial No. 105104116, filed Feb. 5, 2016, the disclosure of which is incorporated by reference herein in its entirety.

TECHNICAL FIELD

The disclosure relates in general to a method for controlling an electronic equipment and a wearable device.

BACKGROUND

As the development of Information and Communication technology, various smart desktop devices and smart portable devices are innovative and inventive. The smart desktop devices and the smart portable devices can be used with wearable devices to create more applications of the smart desktop devices and the smart portable devices. This is an important milestone in Information and Communication technology.

The wearable device can communicate with the smart desktop devices or the smart portable devices. For example, the wearable device can show the important message or an incoming call received by the smart desktop devices or the smart portable devices, or controls an application on the smart desktop devices or the smart portable devices. Moreover, the wearable device also includes detecting, analyzing, and processing functions which the detected signal can be transmitted to the smart desktop devices or the smart portable devices in order to be analyzed and processed.

SUMMARY

According to one embodiment of the disclosure, a method for controlling an electronic equipment is provided. The method includes the following steps. An inertial signal is detected. A gesture is obtained by dividing the inertial signal or classifying the inertial signal. A controlling command is outputted according to the gesture for controlling the electronic equipment, such as a desktop device, a portable device or a wearable device. As such, the electronic equipment can be controlled by the gesture for more convenient applications.

According to another embodiment of the disclosure, a wearable device is provided. The wearable device includes a detecting unit and a processing unit. The detecting unit detects an inertial signal. The processing unit obtains a gesture by dividing the inertial signal or classifying the inertial signal, and outputs a controlling command to control the electronic equipment, such as a desktop device, a portable device or the wearable device. As such, the electronic equipment can be controlled by the gesture for more convenient applications.

Figure 1:
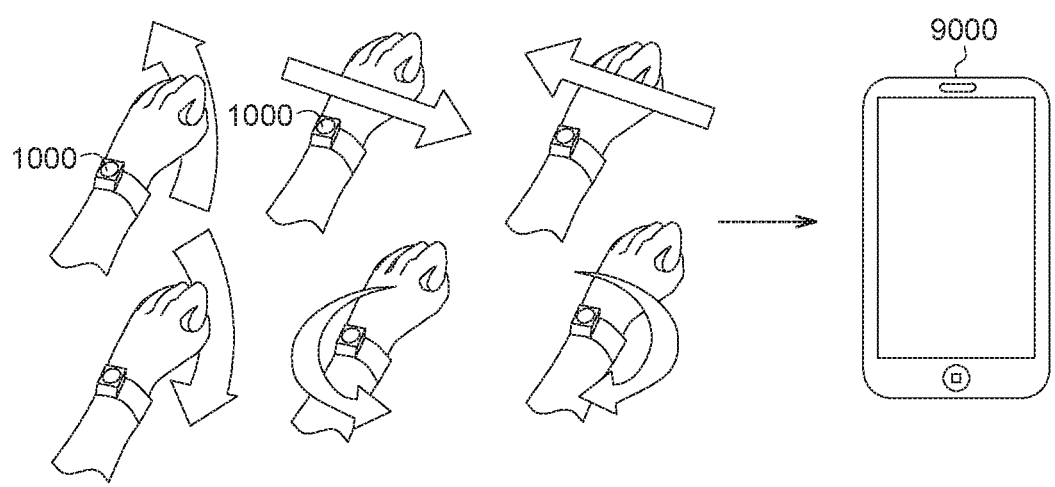
FIG. 1 shows a wearable device controlling a portable device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The disclosure is directed to a method for controlling an electronic equipment and a wearable device. A gesture is obtained by dividing the inertial signal or classifying the inertial signal, and a controlling command is outputted according to the gesture for controlling an electronic equipment, such as a desktop device, a portable device or the wearable device. As such, the electronic equipment controlling by the gesture is more convenient.

Please refer to FIG. 1, which shows a wearable device 1000 controlling a portable device 9000. When a user wears the wearable device 1000, the portable device 9000, such as a smart phone, can be controlled by the wearable device 1000. For example, the application of the portable device 9000 can be controlled by a gesture. The application may be utilized to play, pause or stop the music. Moreover, the wearable device 1000 may include a function of detection, such as heart rate detection, walking pace detection, jumping detection, and running speed detection. The detected signal can be transmitted to the portable device 9000, and then an analyzing procedure or a processing procedure is proceeded.

In one embodiment, the wearable device 1000 may be controlled not only by a touch panel or a physical button, but also by the gestures shown in FIG. 1. As such, when the user is exercising, it is no need to bow for touching the wearable device 1000. The convenience of controlling the wearable device 1000 is improved. Further, because the wearable device 1000 is worn on the user during exercising, the wearable device 1000 also detects an exercise movement when the gesture is detected. In the disclosure, how to exactly recognize the gesture even if the exercise movement and gesture are mixed is an important issue.

Figure 2:
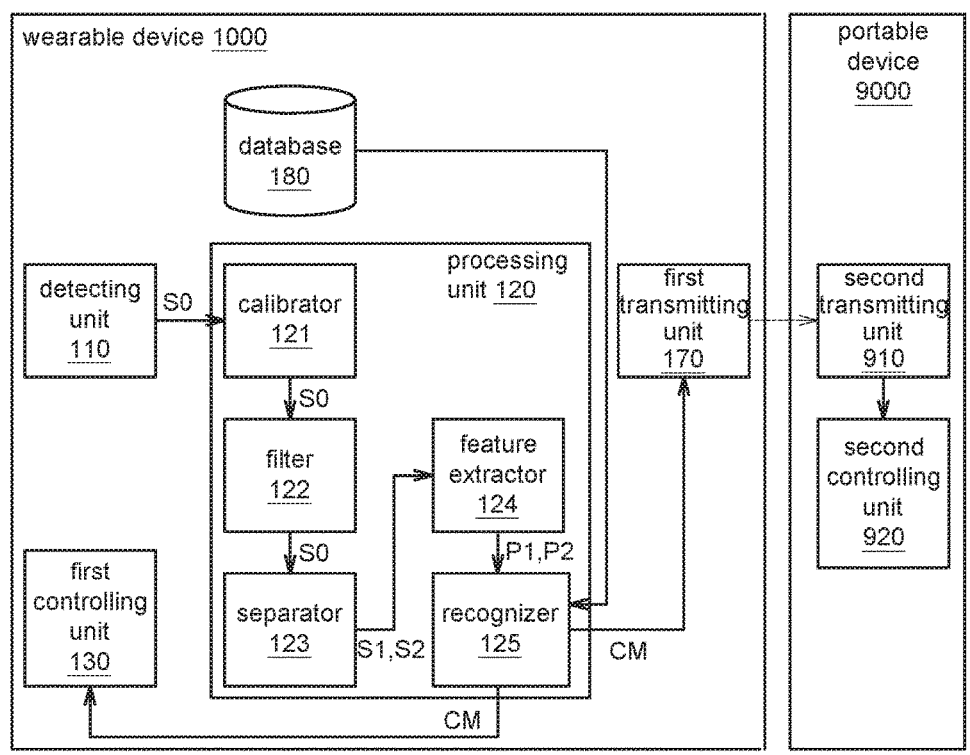
FIG. 2 shows a block diagram of the wearable device according to one embodiment.

Please refer to FIG. 2, which shows a block diagram of the wearable device 1000 according to one embodiment. The wearable device 1000 includes a detecting unit 110, a processing unit 120, a first controlling unit 130, a first transmitting unit 170 and a database 180. The wearable device 1000 may communicate with an electronic equipment, such as the portable device 9000 or a desktop computer, to transmit data or control the electronic equipment. In one embodiment, the electronic equipment is the portable device 9000. However, the electronic equipment communicating with the wearable device 1000 is not limited to be the portable device 9000, and the electronic equipment may be the desktop computer. The portable device 9000 may include a second transmitting unit 910 and a second controlling unit 920. The detecting unit 110 is used for performing various detection procedures. The detecting unit 110 can be, but not limited to, an accelerometer, a gyroscope, or a combination thereof. The processing unit 120 is used for performing various processing procedures. The processing unit 120 may include a microprocessor. Or, the processing unit 120 may be a package chip, a circuit, a circuit board or a storage device storing a plurality of codes. The processing unit 120 may include a calibrator 121, a filter 122, a separator 123, a feature extractor 124 and a recognizer 125. The calibrator 121 is used for performing various calibrating procedures. The filter 122 is used for filtering various signals. The separator 123 is used for separating various signals. The feature extractor 124 is used for extracting various features. The recognizer 125 is used for performing various recognition procedures. The first transmitting unit 170 and the second transmitting unit 910 are used for transmitting and receiving various information. The first transmitting unit 170 and the second transmitting unit 910 may be a wireless communication module or a communication line. The first controlling unit 130 and the second controlling unit 920 are used for performing various computing procedures, analyzing procedures and processing procedures. The first controlling unit 130 and the second controlling unit 920 may be a package chip, a circuit, a circuit board or a storage device storing a plurality of codes.

Figure 3:
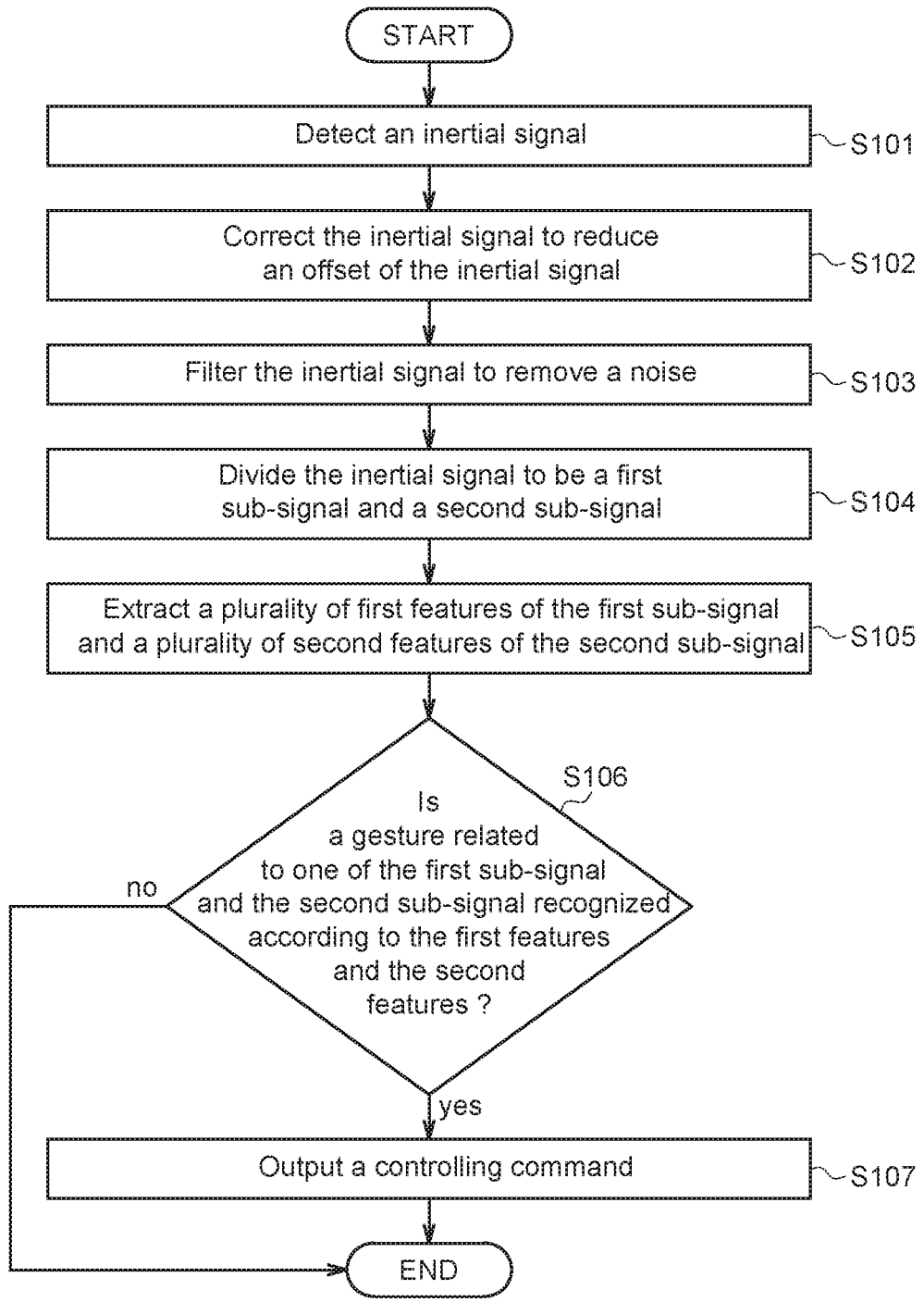
FIG. 3 shows a flowchart of a method for controlling the electronic equipment according to an embodiment.

Please refer to FIG. 3, which shows a flowchart of a method for controlling the electronic equipment according to an embodiment. The electronic equipment to be controlled may be the portable device 9000 of FIG. 2, the wearable device 1000 of FIG. 2 or a desktop computer (not shown). When the user wears the wearable device 1000, the portable device 9000 or the wearable device 1000 itself can be controlled according to the method in FIG. 3. The method is illustrated as below, and the operation of the elements of the wearable device 1000 is also illustrated.

In step S101, the detecting unit 110 detects an inertial signal S0. The detecting unit 110 can be, but not limited to, an accelerometer, a gyroscope, or a combination thereof. The inertial signal S0 may be an acceleration signal or an angular velocity signal. The X directional acceleration, the Y directional acceleration or the Z directional acceleration of the gesture may be obtained from the acceleration signal. The amount of rotation of the gesture may be obtained from the angular velocity signal.

Next, in step S102, the calibrator 121 corrects the inertial signal S0 to reduce an offset of the inertial signal S0. In one embodiment, the calibrator 121 may correct the inertial signal S0 by a six-axis dynamic calibration based on a fixed parameter, such as gravity. The six directions in the six-axis dynamic calibration may include a positive X direction, a negative X direction, a positive Y direction, a negative Y direction, a positive Z direction, and a negative Z direction.

In step S103, the filter 122 filters the inertial signal S0 to remove a noise. In one embodiment, the filter 122 filters out the high frequency noise in order to remove the user jitter noise.

In one embodiment, for removing the high frequency noise of the acceleration signal and the angular velocity signal, the filter 122 may be a low pass filter, such as moving average filter (MAF), a Butterworth filter or a Chebyshev filter, but not limited thereto. In general, the frequency of human hand movement is less than 12 Hz. For accurately recognizing the gesture, the cut-off frequency of the low pass filter can be, but not limited to, set to be 20 Hz, to remove the high frequency jitter noise from user.

Figure 4:
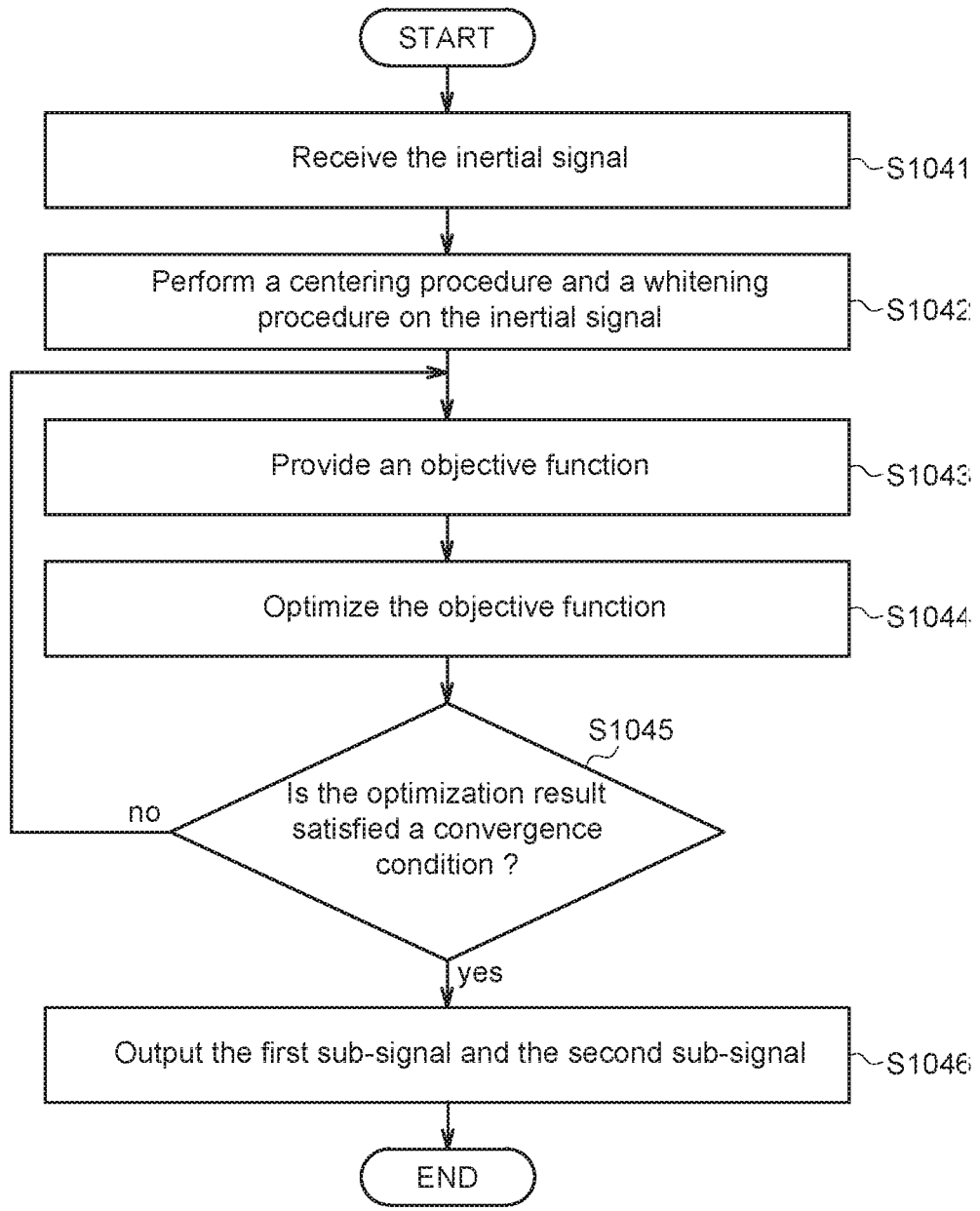
FIG. 4 shows detail steps of the step S104 in FIG. 3.

In step S104, the separator 123 divides the inertial signal S0 to be a first sub-signal S1 and a second sub-signal S2. In one embodiment, the separator 123 may divide the inertial signal S0 by a Fast Independent Component Analysis algorithm (Fast ICA algorithm). Please refer to FIG. 4, which shows detail steps of the step S104 in FIG. 3. The step S104 may include steps S1041 to S1046. In step S1041, the separator 123 receives the inertial signal S0. Then, in step S1042, the separator 123 performs a centering procedure and a whitening procedure on the inertial signal S0. In the centering procedure, original data is subtracted the average value to obtain a centralization data. In the whitening procedure, a whitening matrix is obtained according to a covariance matrix, an unitary matrix, an eigenmatrix, and then multiplies by the centralization data for completing the whitening procedure.

Then, in step S1043, the separator 123 provides an objective function. In step S1044, the separator 123 optimizes the objective function.

In step S1045, the separator 123 determines whether the optimization result is satisfied a convergence condition or not. If the optimization result is satisfied the convergence condition, then the process proceeds to step S1046; if the optimization result is not satisfied the convergence condition, and then the process returns to step S1043. For example, the convergence condition may be that two consecutive optimization results are almost the same. Or, the convergence condition may be that the repeat times are reached a default value.

In step S1046, the separator 123 outputs the first sub-signal S1 and the second sub-signal S2. So far, the step S104 of dividing the inertial signal S0 is completed.

Next, please refer to FIG. 3. In step S105, the feature extractor 124 extracts a plurality of first features P1 of the first sub-signal S1 and a plurality of second features P2 of the second sub-signal S2. For example, the first features P1 and the second features P2 may be mean, standard deviation (STD), correlation between axis (corr), mean absolute deviation (MAD), root mean square (RMS), variance (VAR) or interquartile range (IQR).

For example, the mean of a single sampling window may be calculated according to the following equation (1).

$$\text{mean} = \frac{1}{W}\sum_{i=1}^{W} x_i \quad (1)$$

$x_i$ is the acceleration signal or the angular velocity signal. W is the signal length of the gesture (window size).

The variance (VAR) may be calculated according to the following equation (2).

$$\text{VAR} = \frac{1}{W-1}\sum_{i=1}^{W}(x_i - m)^2 \quad (2)$$

m is the mean of the acceleration signal or the angular velocity signal.

The standard deviation (STD) is the square root of the variation. The standard deviation (STD) may be calculated according to the following equation (3).

$$STD = \sqrt{\frac{1}{W-1}\sum_{i=1}^{W}(x_i - m)^2} \quad (3)$$

Moreover, if the means of the different data groups are close, the interquartile range (IQR) may represent the distribution of the individual data group to prevent the statistic result from being affected by any extreme value.

The correlation between axis (corr) is a ratio of the covariance to the inner product of the standard deviations of the signals, such as the acceleration signal. The correlation between axis (corr) may represent the relationship between the acceleration signals (or the angular velocity signals) measured on the axes. The correlation between axis (corr) may be calculated according to the following equation (4).

$$corr_{xy} = \frac{cov(x, y)}{\sigma_x \sigma_y} = \frac{E((x-m_x)(y-m_y))}{\sigma_x \sigma_y} \quad (4)$$

E is the expected value of the acceleration signals (or the angular velocity signals). $m_x$ and $m_y$ are the averages of the acceleration signals (or the angular velocity signals) measured on the two axes. $\sigma_x$ and $\sigma_y$ are the standard deviations of the acceleration signals (or the angular velocity signals) measured on the two axes.

The mean absolute deviation (MAD) may be calculated according to the following equation (5).

$$MAD = \frac{1}{W} \sum_{i=1}^{W} |x_i - m| \quad (5)$$

The root mean square (RMS) may be calculated according to the following equation (6).

$$RMS = \sqrt{\frac{1}{W} \sum_{i=1}^{W} x_i^2} \quad (6)$$

Next, in step S106, it is determined that whether the recognizer 125 recognizes a gesture related to one of the first sub-signal S1 and the second sub-signal S2 according to the first features P1 and the second features P2. In the database 180, the relationship between various gestures and features and the reference information are stored. The recognizer 125 performs a recognition procedure according to the first features P1 and the second features P2 captured at the step S105. If one of the first sub-signal S1 or the second sub-signal S2 is related to some kind of gestures, then the process proceeds to step S107. If both of the first sub-signal S1 and the second sub-signal S2 are not related to some kind of gestures, then the process is terminated to let user know that the gesture is not clear enough to be recognized.

Although the inertial signal S0 is divided to the first sub-signal S1 and the second sub-signal S2 at the step S104, it still does not know which one of them is related to the gesture and which one of them is related to the exercise movement. Therefore, the recognizer 125 can determine which one of them is related to the gesture and which one of them is related to the exercise movement according to the data stored in the database 180.

In the step S106, the recognizer 125 may recognize the gesture related to one of the first sub-signal S1 and the second sub-signal S2 by a decision tree algorithm, a probabilistic neural network algorithm or a fuzzy neural network algorithm, but not limited thereto. The decision tree algorithm, the probabilistic neural network algorithm and the fuzzy neural network algorithm have different advantages. For example, the decision tree algorithm has simple logic and is suitable to be implemented by hardware.

The probabilistic neural network algorithm has the following four advantages. First, because the weightings are obtained directly from the training data, the training procedure is fast. Second, when a new group is added into the system, the weighting of the new group can be defied without updating all weightings. As such, the training efficiency is high. Third, it has high error tolerance. Even if a small amount of data is inputted, the parameters still may be adjusted according to the query. Fourth, the complexity of the network linking is low.

The fuzzy neural network algorithm may overcome the differences among the human factors through the fuzzy function.

In step S107, the recognizer 125 outputs a controlling command CM according to the gesture. The controlling command CM may be transmitted to the first controlling unit 130 of the wearable device 1000 to control the wearable device 1000 itself; or, the controlling command CM may be transmitted to the second controlling unit 920 of the portable device 9000 via the first transmitting unit 170 and the second transmitting unit 910 to control the portable device 9000.

For example, when the user wants to play music on the portable device 9000, he may wave his hand from down to up. Then, the accelerometer and the gyroscope in the detecting unit 110 may detect the inertial signal S0 along a direction parallel to the wave direction. The inertial signal S0 may include the acceleration signal and the angular velocity signal. After the recognizer 125 obtains this gesture, the controlling command CM is transmitted to the portable device 9000 to play music via the wireless transmission of the first transmitting unit 170. Similar, when the user wants to pulse the music on the portable device 9000, he may wave his hand from up to down, then the music can be pulsed. The relationship between the gestures and the controlling commands are not limited thereto.

In one embodiment, if the portable device 9000 is installed Android operating system, the functions of playing music and pulsing music may be implemented by the start( ) API and the pause( ) API in the mediaPlayer class.

Besides, when the user wants to increase the volume, decrease the volume, switch to the previous song, and switch to the next song, he may rotate his hand to the right, rotate his hand to the left, wave his hand to the right and wave his hand to the left respectively. The relationship between the gestures and the controlling commands are not limited thereto.

In one embodiment, if the portable device 9000 is installed Android operating system, the functions of switching to the previous song and switching to the next song may be implemented by the next( ) API and previous( ) in the mediaPlayer class, and the functions of increasing the volume and decreasing the volume can be implemented by the adjustVolume( ) API in the audioManager class.

Figure 5:
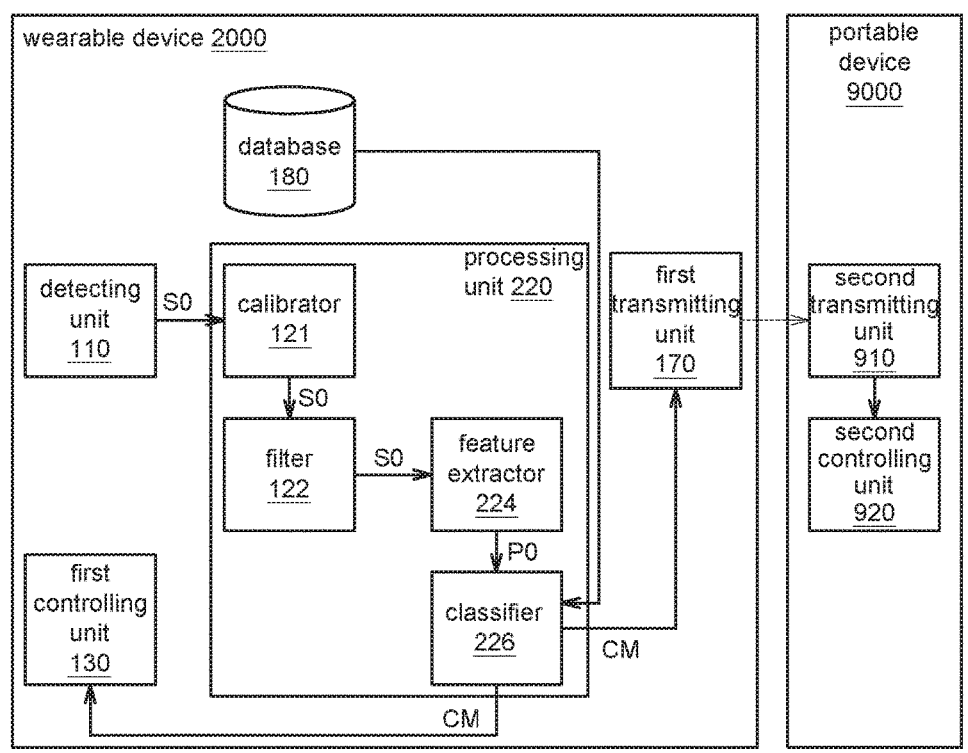
FIG. 5 shows a block diagram of a wearable device according to another embodiment.
Figure 6:
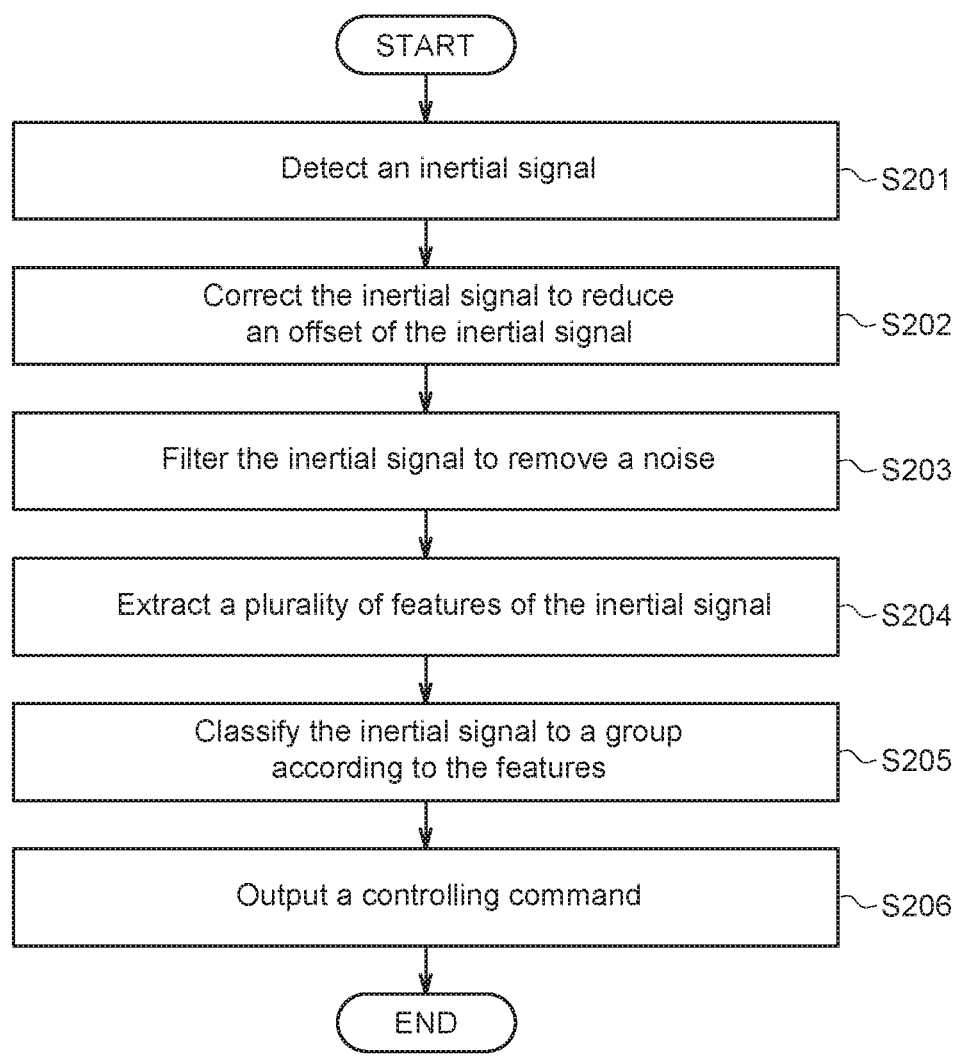
FIG. 6 shows a flowchart of a method for controlling the electronic equipment according to another embodiment.

Please refer to FIGS. 5 and 6. FIG. 5 shows a block diagram of a wearable device 2000 according to another embodiment. FIG. 6 shows a flowchart of a method for controlling the electronic equipment according to another embodiment. The electronic equipment to be controlled may be the portable device 9000 of FIG. 5, the wearable device 2000 of FIG. 5, or a desktop computer (not shown). In FIG. 5, the wearable device 2000 may include the detecting unit 110, a processing unit 220, the first controlling unit 130, the first transmitting unit 170 and the database 180. The processing unit 220 may include a calibrator 121, a filter 122, a feature extractor 224 and a classifier 226. The portable device 9000 may include the second transmitting unit 910 and the second controlling unit 920. The detecting unit 110, the calibrator 121, the filter 122, the first controlling unit 130, the second controlling unit 920, the first transmitting unit 170 and the second transmitting unit 910 have been described above, and similarities are not repeated here. Moreover, the steps S201 to S203 of FIG. 6 are similar to the steps S101 to S103 of FIG. 3, and similarities are not repeated here.

In step S204, the feature extractor 224 extracts a plurality of features P0 of the inertial signal S0. For example, the features P0 may be mean, standard deviation (STD), correlation between axis (corr), mean absolute deviation (MAD), root mean square (RMS), variance (VAR) or interquartile range (IQR).

In step S205, the classifier 226 classifies the inertial signal S0 to a group according to the features P0. In this step, the classifier 226 may classify the inertial signal S0 to a group by a support vector machine algorithm (SVM algorithm).

The SVM algorithm may create a predicting model, i.e. learning machine, according to given some measurement data or observation data. If a new data is inputted, an output data may be predicted through the predicting model.

The SVM algorithm is a supervised learning method which may create a function or a learning model according to the training data, and then predict a new instance. The training data may include an input which is a vector and a predicted output which is a continuous value (regression analysis) or a class tag (classification).

The SVM algorithm is one classification algorithm in both applications of the linear data and nonlinear data inputs. The original data is converted to be a higher dimension by the SVM algorithm. A hyperplane may be found according to the super vectors in the training data set of this higher dimension. The hyperplane is used to classify data. In the SVM algorithm, the maximum marginal hyperplane may be found, because the maximum marginal hyperplane has high classification accuracy and has advantages on recognizing small amount of samples, nonlinear data and high dimensions.

The decision rule obtained from the limited training samples can achieve low error rate on the independent testing set. As long as the number of samples is increased, the model may be recomputed to modify appropriately for improving the accuracy rate. Comparing with the current monitor system, this model is not a fixed experience function, and may be adapted by learning.

In the SVM algorithm, the classifier 226 may create a feature vector classifier according to the training group and then the feature vector classifier may be verified according to the testing group.

Figure 7A:
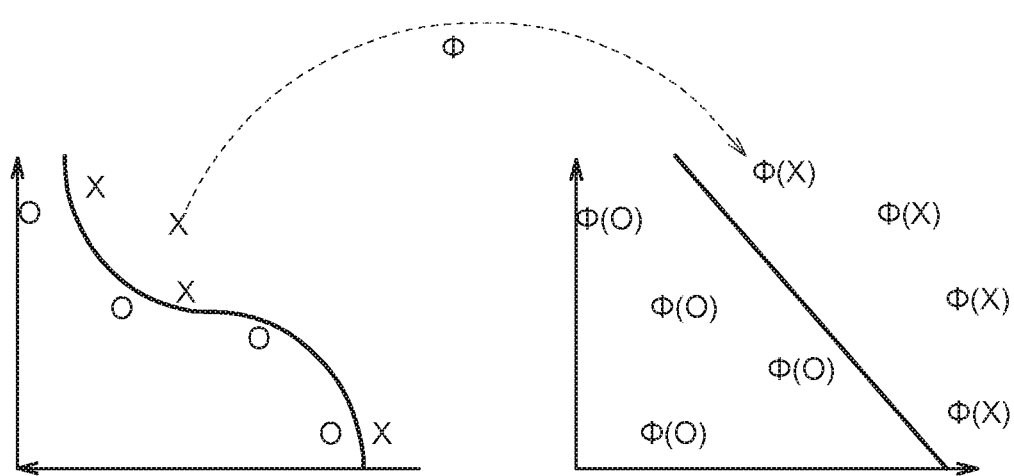
FIGS. 7A to 7B illustrate a support vector machine (SVM) algorithm.
Figure 7B:
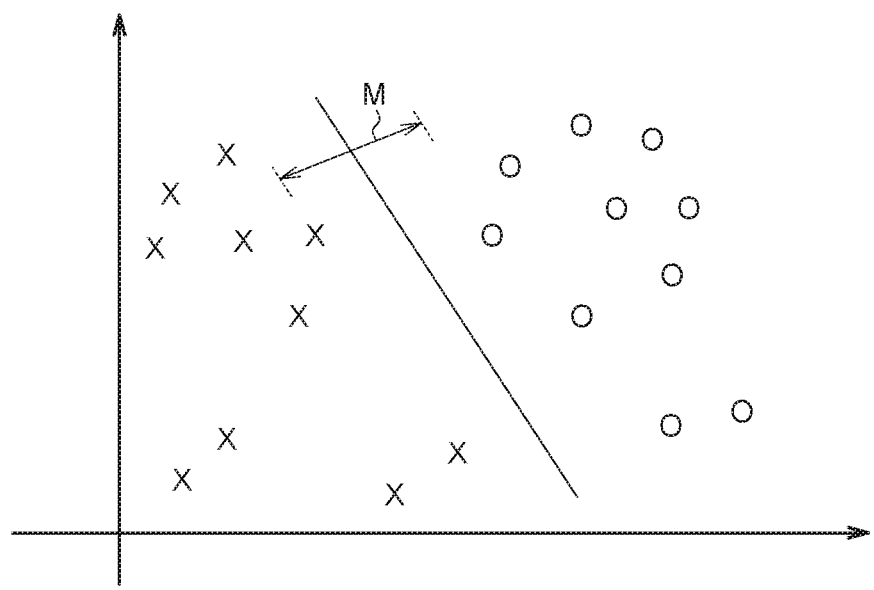

For example, please refer to FIGS. 7A to 7B, which illustrate the SVM algorithm. The feature vectors are inputted as inputs Xi, i=1, . . . , n. Outputs Yi belonging the set $\{1, \ldots, C\}$ is defined, where C is the number of groups. The training procedure is to find out the function f which may minimize $\Sigma_{i=1}^{n}(Y_i - f(Y_i))^2$. A kernel function $\phi$, one of the key steps, is utilized to convert the feature vector to another feature space, such that the classification can be performed through a linear function. The feature conversion is shown in FIG. 7A. In the SVM algorithm, maximal margin is also another of the key steps. Besides classifying, the distance of margin M between each of the groups and the function f is maximized (as shown in FIG. 7B).

Figure 8:
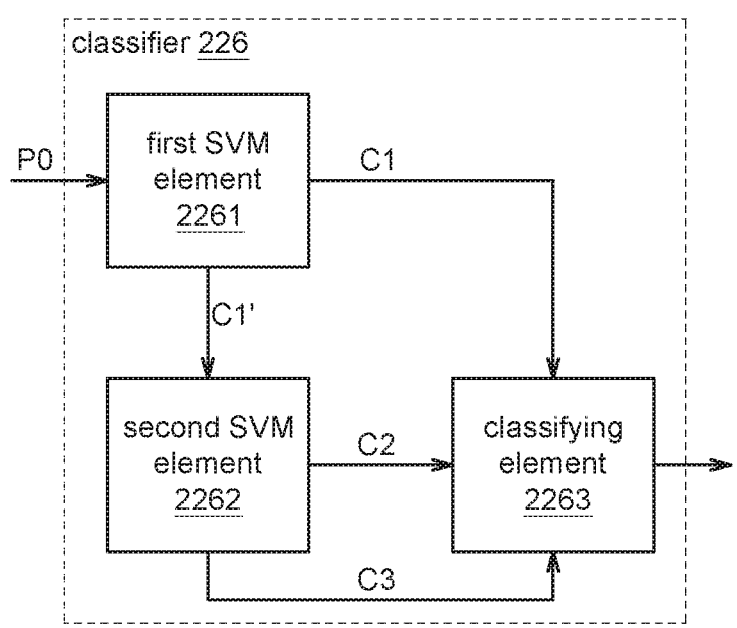
FIG. 8 shows a classifier according to one embodiment.

Please refer to FIG. 8, which shows the classifier 226 according to one embodiment. In one embodiment, the classifier 226 performing the SVM algorithm may include a first SVM element 2261, a second SVM element 2262 and a classifying element 2263. The features P0 of the inertial signal S0 are inputted into the first SVM element 2261, and then the first SVM element 2261 classifies the inertial signal S0 to a group C1 or a group C1' according to the features P0. For example, the group C1 is a non-movement state and the group C1' is a movement state.

If the first SVM element 2261 classifies the inertial signal S0 to the group C1', then the features P0 of the inertial signal S0 are inputted to the second SVM element 2262 for classifying. The second SVM element 2262 further classifies the inertial signal S0 to a group C2 or a group C3 according to the features P0. For example, the group C2 is exercise movement state and the group C3 is an exercise-gesture state. The classifying element 2263 outputs the group C1, the group C2 or the group C3 which the inertial signal S0 is classified to. If the inertial signal S0 is classified to the group C3, then the exercise-gesture related to the inertial signal S0 is obtained according to the group C3.

That is to say, if the gesture and the exercise movement are mixed in the inertial signal S0, obtaining the gesture can be performed by not only dividing the inertial signal S0 but also classifying the inertial signal S0 based on the SVM algorithm.

Please refer to FIG. 6. In step S206, the classifier 226 outputs the controlling command CM according to the gesture. The controlling command CM can be transmitted to the first controlling unit 130 of the wearable device 2000 itself to control the wearable device 2000 itself; or, the controlling command CM can be transmitted to the second controlling unit 920 of the portable device 9000 via the first transmitting unit 170 and the second transmitting unit 910 to control the portable device 9000.

According to those embodiments, the wearable device 1000, 2000 may be controlled via not only any touch panel or any physical button but also the gestures shown in FIG. 1, expect. As such, when the user is exercising, it is no need to bow for touching the wearable device 1000, 2000. The convenience of controlling the wearable device 1000, 2000 is improved. Further, even if the exercise movement and the gesture are mixed, the gesture can be recognized and then various controlling procedures can be performed accordingly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for controlling an electronic equipment, comprising:
    detecting an inertial signal;
    obtaining a gesture by dividing the inertial signal or classifying the inertial signal, wherein the inertial signal is classified into a first group and a second group, and the second group is classified into a first sub-group and a second sub-group, the first group is a non-movement state, the second group is a movement state, the first sub-group is an exercise movement state, and the second sub-group is an exercise-gesture state; and
    outputting a controlling command according to the gesture to control the electronic equipment,
    wherein the step of obtaining the gesture includes:
    dividing the inertial signal to be a first sub-signal and a second sub-signal;

extracting a plurality of first features of the first sub-signal and a plurality of second features of the second sub-signal; and recognizing the gesture related to one of the first sub-signal and the second sub-signal according to the first features and the second features.

2. The method for controlling the electronic equipment according to claim 1, wherein in the step of detecting the inertial signal, the inertial signal is an acceleration signal or an angular velocity signal.

3. The method for controlling the electronic equipment according to claim 1, further comprising:

correcting the inertia signal to reduce an offset of the inertia signal.

4. The method for controlling the electronic equipment according to claim 1, further comprising:

filtering the inertia signal to remove noise.

5. The method for controlling the electronic equipment according to claim 1, wherein in the step of dividing the inertial signal to be the first sub-signal and the second sub-signal, the inertial signal is divided by a Fast Independent Component Analysis algorithm (Fast ICA algorithm).

6. The method for controlling the electronic equipment according to claim 1, wherein in the step of recognizing the gesture related to one of the first sub-signal and second sub-signal, the gesture is recognized by a decision tree algorithm, a probabilistic neural network algorithm or a fuzzy neural network algorithm.

7. The method for controlling the electronic equipment according to claim 1, wherein the step of obtaining the gesture includes:

extracting a plurality of features of the inertial signal;
classifying the inertial signal according to the features; and
recognizing the gesture related to the inertial signal.

8. The method for controlling the electronic equipment according to claim 7, wherein in the step of classifying the inertial signal, the inertial signal is classified by a support vector machine algorithm (SVM algorithm).

9. A wearable device, comprising:

a detecting unit, for detecting an inertial signal; and
a processing unit, for obtaining a gesture by dividing the inertial signal or classifying the inertial, wherein the inertial signal is classified into a first group and a second group, and the second group is classified into a first sub-group and a second sub-group, the first group is a non-movement state, the second group is a movement state, the first sub-group is an exercise movement state, and the second sub-group is an exercise-gesture state, and for outputting a controlling command according to the gesture to control electronic equipment, wherein the processing unit includes:

a separator, for dividing the inertial signal into a first sub-signal and a second sub-signal;
a feature extractor, for extracting a plurality of first features of the first sub-signal and a plurality of second features of the second sub-signal; and
a recognizer, for recognizing the gesture related to one of the first sub-signal and second sub-signal according to the first features and the second features.

10. The wearable device according to claim 9, wherein the detecting unit is an accelerometer or a gyroscope.

11. The wearable device according to claim 9, wherein the processing unit includes:

a calibrator, for correcting the inertia signal to reduce an offset of the inertia signal.

12. The wearable device according to claim 9, wherein the processing unit includes:

a filter, for filtering the inertia signal to remove noise.

13. The wearable device according to claim 9, wherein the separator divides the inertial signal into the first sub-signal and the second sub-signal by a Fast Independent Component Analysis Algorithm (Fast ICA Algorithm).

14. The wearable device according to claim 9, wherein the recognizer recognizes the gesture related to one of the first sub-signal and second sub-signal by a decision tree algorithm, a probabilistic neural network algorithm or a fuzzy neural network algorithm.

15. The wearable device according to claim 9, wherein the processing unit includes:

a feature extractor, for extracting a plurality of features of the inertial signal; and
a classifier, for classifying the inertial signal according to the features, and for recognizing the gesture related to the inertial signal.

16. The wearable device according to claim 15, wherein the classifier classifies the inertial signal by a support vector machine algorithm (SVM algorithm).

17. The wearable device according to claim 9, wherein the electronic equipment is the wearable device or a portable device, and the wearable device further comprises:

a database, for storing a reference data used for obtaining the gesture;
a first controlling unit, connecting to the processing unit; and
a first transmitting unit, connecting the processing unit and a second transmitting unit of the portable device, wherein the second transmitting unit is connected to a second controlling unit of the portable device;
wherein the controlling command is transmitted to the first controlling unit to control the wearable device; or, the controlling command is transmitted to the second controlling via the first transmitting unit and the second transmitting unit to control the portable device.

* * * * *